United States Patent Office 3,423,673
Patented Jan. 21, 1969

3,423,673
APPARATUS UTILIZING MAGNETOSTRICTIVE MEMBER FOR MEASURING LINEAR DISPLACEMENT BETWEEN TWO BODIES
William F. Bailey, Garden City, and Reinhard K. Hellmann, Westbury, N.Y., assignors to Hazeltine Research, Inc., a corporation of Illinois
Filed July 13, 1965, Ser. No. 471,593
U.S. Cl. 324—34
Int. Cl. G01r 33/00
10 Claims

ABSTRACT OF THE DISCLOSURE

Disclosed is apparatus for measuring relative linear displacement between a fixed and a movable body by utilizing a magnetostrictive member stationed to the fixed body and having a propagating stress wave established therein of a wavelength substantially smaller than the length of the member. Stationed to the movable body and coupled to the member is a single induction pickup winding for deriving an output signal representative of the propagating stress wave at the coupling point. Responsive to the output signal is circuitry for generating a resultant signal each time the movable body undergoes a predetermined increment of displacement from the fixed body, and for utilizing the resultant signals to provide an indication of total relative linear displacement undergone by the movable body.

---

The present invention relates, in general, to apparatus for measuring relative linear displacement between two bodies. More specifically, the present invention relates to such apparatus, wherein the central element is a member of magnetostrictive material.

A particularly important area of use for linear displacement measuring apparatus is the manufacturing industry, for example, where many different linear displacement machine operations exists. These operations—e.g., shaping, planing, milling, drilling, etc.—are each characterized by a relative linear displacement between two bodies. That is, a relative linear displacement between a machine tool element and a work holding element, one of which is usually held fixed. Various arrangements have been devised to control the degree of precision of such machine operations. For example, where precision requirements are high, light interferometry techniques have been devised to detect and measure relative linear displacement. On the other hand, where precision requirements are low, electromagnetic and capacitive techniques have been used. A need exists, however, for a simple and versatile arrangement for use in those machine operations which cover a wide range of medium precision. In such instances, light interferometry techniques are unnecessarily over-accurate, while many capacitive and other presently existing techniques, are not accurate enough.

It is therefore an object of the present invention to provide linear displacement measuring apparatus which fills this void.

It is a general object of the present invention to provide apparatus for measuring relative linear displacement between two bodies, utilizing wave propagation techniques in magnetostrictive material.

In accordance with the present invention apparatus for measuring relative displacement between a fixed body and a movable body, comprises an elongated member of magnetostrictive material stationed to the fixed body and extending along the direction of motion of the movable body, and excitation means including an excitation signal generator, for establishing a propagating stress wave in the member. The apparatus further includes means stationed to the movable body and coupled to the member at a point determined by the relative linear displacement of the two bodies for deriving an output signal representative of the cyclic variation of the stress wave in the member at the coupling point and indicator means responsive jointly to the excitation signal and the output signal for providing an indication of relative linear displacement between the fixed body and the movable body.

For a better understanding of the present invention together with other and further objects thereof, reference is had to the following description taken in connection with the accompanying drawings, and its scope will be pointed out in the appended claims.

Referring to the drawings:

FIG. 1b is a block diagram of a phase comparator suitable for use as the comparator 19 in FIG. 1a;

Figure 1A:
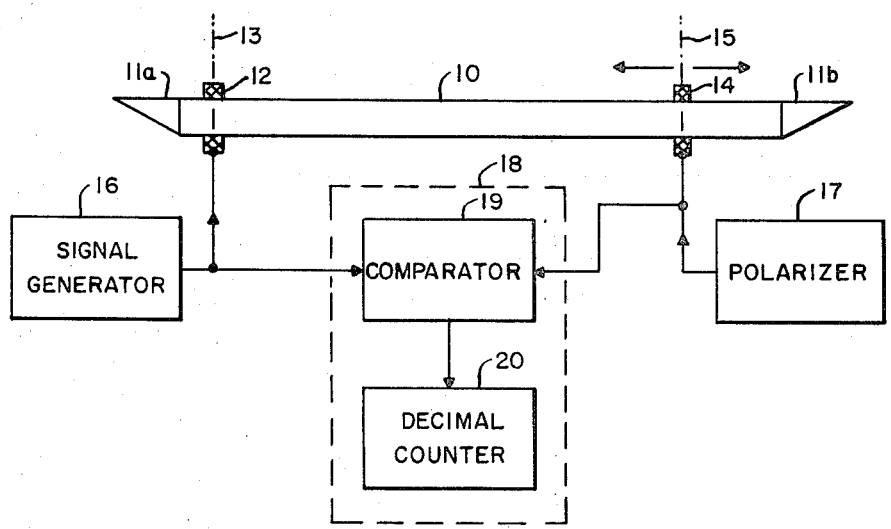
FIG. 1a is a block diagram, partly schematic, of a typical embodiment of the present invention.
Figure 1B:
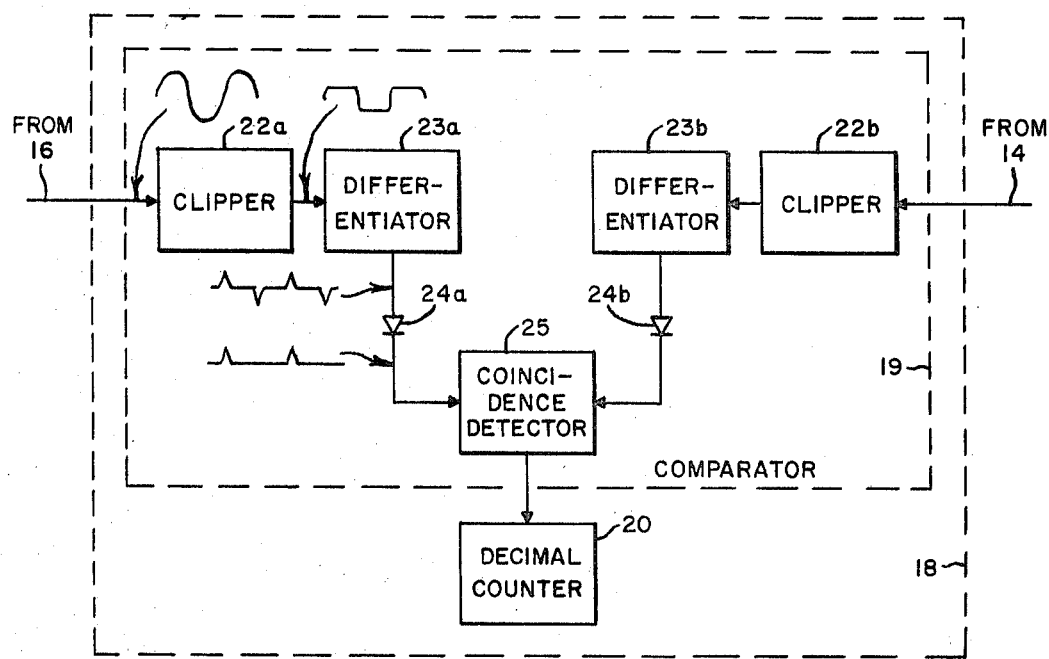
Figure 1C:
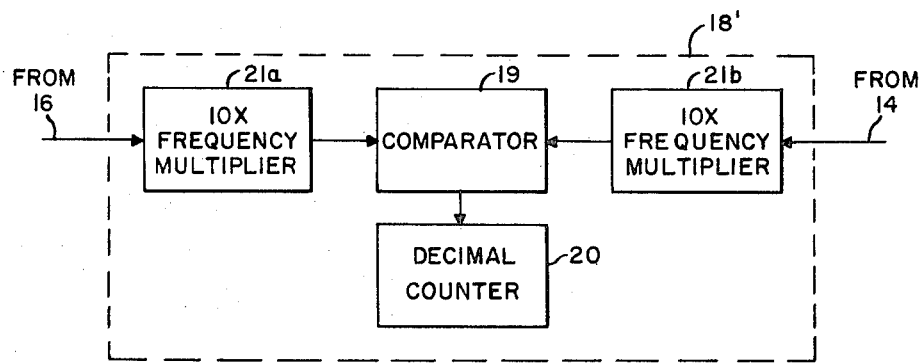
Figure 2:
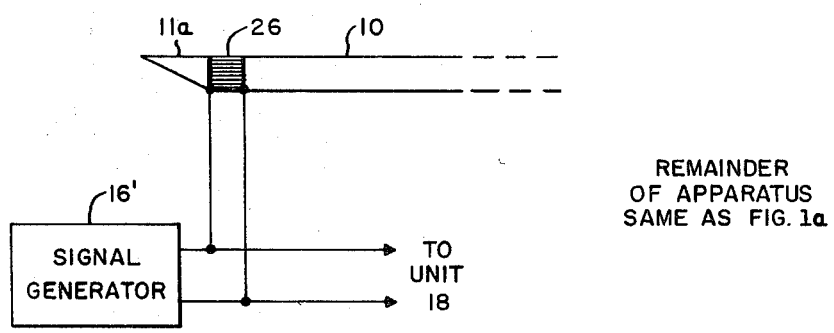

FIG. 1c is a block diagram of another indicator means 18′ which may be used in place of the unit 18 in FIG. 1a, and FIG. 2 is a block diagram, partly schematic, of another excitation means, which may be used in place of the units 12 and 16 of FIG. 1a.

Description of the apparatus of FIG. 1a

Shown in FIG. 1a is an example of one embodiment of apparatus for measuring relative linear displacement between two bodies, constructed in accordance with the present invention. The apparatus of FIG. 1a includes an elongated member 10 of magnetostrictive material for converting magnetic flux variations into traveling stress waves, and vice versa. Member 10 is stationed, for example, at center line 13 to a fixed body such as a fixed element of a machine (not shown) and extends along the direction of motion of a movable body, such as a movable element of the machine (also not shown). The over-all length of the member is not critical but should be sufficiently long to provide an indication of linear displacement at least as great as the displacement anticipated in actual operation. Each end of member 10 is connected, as shown, in suitable terminations designated 11a and 11b, which serve to suppress end reflections of the stress wave propagating along the member. Terminations 11a and 11b may be of conventional construction.

In the apparatus of FIG. 1a, excitation means for establishing a propagating stress wave in member 10 includes an excitation signal generator 16 and an excitation winding 12. Excitation winding 12 is coupled magnetically to member 10 and is effective in response to an excitation signal applied to it, to establish a stress wave propagating along the member. The distance between corresponding points on the propagating stress wave can be determined by the familiar wavelength expression $\lambda = v/f$, where $v$ equals the propagation velocity of the stress wave in the member (a constant for the particular magnetostrictive material selected for member 10), and where $f$ equals the frequency of the stress wave in the member. The excitation winding 12, shown in FIG. 1a as encircling a transverse section of member 10 centered around center line 13, is preferably chosen to be resonant at a frequency equal to the frequency of the excitation signal applied to it. The frequency ($f$) in the expression $\lambda = v/f$ will then be equal to the frequency of the applied excitation signal.

As mentioned previously, the apparatus of FIG. 1a also includes an excitation signal generator 16 for supplying an excitation signal to the excitation winding 12 to cause it to develop the propagating stress wave in member 10. Signal source 16 may be either a pulse generator, or preferably, a sine wave generator. In either case, the excitation signal developed by signal source 16 includes both a D-C, or polarizing component, and an A-C, or excitation, component. The output signal developed by source 16 is jointly coupled to excitation winding 12 and to unit 18 which will be described hereinafter.

The apparatus of FIG. 1a further includes means, in this case, an induction winding 14, stationed to the movable element of the machine (not shown) and coupled to a point on member 10 determined by the relative linear displacement between the movable element and the fixed element of the machine (not shown) for deriving an electrical output signal representative of the cyclic variations of the stress wave in member 10 at the coupling point. In FIG. 1a the induction winding 14, shown as encircling a transverse section of member 10 centered around center line 15, is preferably chosen to be resonant at a frequency equal to the frequency of the stress wave propagating along member 10.

Associated with induction winding 14 is a polarizer unit 17, for establishing a polarizing magnetic flux in the section of member 10 with which it is magnetically coupled to effect the response of the induction winding 14 to a stress wave propagating along that section of member 10. The polarizing means 17 may be a permanent magnetic, or preferably, a source of potential and a resistor connected in a direct-current circuit with the induction winding 14, thus providing a polarizing D-C bias current to the induction winding.

The apparatus of FIG. 1a finally includes indicator means shown as dotted box 18, for comparing the A-C component of the excitation signal with the output signal from induction winding 14, for computing relative slippage between the signals, and for providing an indication of the relative linear displacement of the movable element from the fixed element of the machine (not shown). Means 18 in FIG. 1a includes a comparator 19, in this case for comparing the phase of the supplied excitation signal to the phase of the output signal derived by induction winding 14, for providing a pulse output whenever the two signals are in phase. A suitable phase comparator of conventional design is shown in FIG. 1b, which figure is believed to be self-explanatory.

Means 18 also includes an accumulator, in this case a suitable decimal counter 20, which may be of conventional construction, for counting the pulses produced by the comparator 19, whenever the two compared signals are in phase. As will be made clear hereinafter, each pulse so provided by comparator 19 is indicative of a unit amount of movable element displacement relative to the fixed element of the machine, while the number of pulses counted is indicative of the total relative linear displacement between the movable element and the fixed element of the machine. Counter 20 may, if desired, be arranged to develop an output signal whenever a predetermined count is reached—indicative of a cycle of machine operation being completed—and additional equipment (not shown) may be provided to operate in response to the signal from counter 20 to return the movable machine element to its "start" position at that time. The movable element will then be ready for the next cycle of machine operation.

While comparator 19 of FIG. 1a has been described as being a phase comparator, it will be recognized by those skilled in the art that comparator 19 may be, as easily, a suitable amplitude comparator. An amplitude comparator would operate to compare the amplitude of the A-C component of the excitation signal with the amplitude of the output signal from induction winding 14, for providing a pulse output whenever the two amplitudes are equal.

*Operation of the apparatus of FIG. 1a*

In considering the operation of the described apparatus of FIG. 1a it will be assumed that the A-C component of the excitation signal from generator 16 is a sine wave having a frequency of 1 mc. per second.

Application of the excitation signal from generator 16 to excitation winding 12 causes a D-C polarization current and an A-C excitation current of 1 mc. frequency to flow in the winding. The polarization current in winding 12 establishes a fixed value of polarizing magnetic flux in a narrow transverse section of member 10. This fixed value of polarizing flux in turn establishes a fixed longitudinal stress in the aforementioned section of member 10. The excitation current in winding 12 causes the polarizing flux, and therefore the longitudinal stress, in the aforementioned section of member 10 to vary in accordance with the A-C variation of the excitation current. This variation in stress creates two similar longitudinal stress waves of 1 mc. frequency which travel in opposite directions along the longitudinal axis of member 10. The velocity of propagation of these stress waves is determined in accordance with the expression $v=(E/\rho)^{1/2}$, where $v$ equals the propagation velocity in meters per second; E equals the Young's modulus for member 10 in Newton's per square meter; and where $\rho$ equals the density of member 10 in kilograms per cubic meter. It will be assumed, for purposes of illustration only, that the magnetostrictive material chosen for member 10 has a velocity of propagation equal to one thousand meters per second.

The stress wave traveling in the direction of the end termination 11a is effectively absorbed there and is not used. The stress wave traveling in the direction of the end termination 11b is effective in modifying the permeability of the magnetostrictive member 10 according to the sinusoidal waveform of the propagating stress wave. As the movable element of the machine moves in accordance with its prescribed machine function, induction winding 14 attached thereto also moves in the same manner. Since winding 14 encircles a transverse section of member 10, the movement of the movable element of the machine causes winding 14 to encounter different portions of the propagating stress wave as its moves along the member 10. As winding 14 encounters the different portions of the propagating stress wave, the flux established within winding 14 by the polarizing unit 17, is continuously changed due to the continuous permeability modifications established in member 10 by the propagating stress wave. These changes in flux induce a signal in winding 14 indicative of the permeability modifications, and therefore, indicative of the cyclic variations of the stress wave. The signal induced in winding 14 is of the same frequency as that of the propagating stress wave, namely 1 mc., and is presented at an output of winding 14. This output signal is then coupled to an input of comparator 19, where it is compared, in phase, with the A-C component of the excitation signal from generator 16, as shown in more detail in FIG. 1b.

It will be noted that as winding 14 moves to the right, for example, in FIG. 1a the output signal from winding 14 and the A-C component of the excitation signal from generator 16 will be in phase each time the centerline 15 of winding 14 passes a point on member 10 which is an integral number of wave lengths from the centerline 13 of winding 12. Since one wave length in member 10 is determined by the expression $\lambda=v/f$, comparator 19 will develop an output pulse for every millimeter of movement of winding 14 (assuming $v=$ one thousand meters per second and $f=1$ mc. per second). These output signals are accumulated and displayed by the decimal counter 20. Thus, once a pattern of propagating stress waves has been established in the magnetostrictive member 10, every time winding 14 moves along member 10 an amount equal to one wave length, a signal indicative of a one millimeter displacement of the movable element of the machine is recorded by counter 20. During the interval between wave lengths, no signal is provided by comparator 19 to counter 20, since the output signal of winding 14 and the A-C component of the excitation signal from generator 16 are not in phase during that interval.

Total linear displacement of winding 14 may be determined by noting the reading on counter 20 at the beginning and end of the movement of winding 14. That is, assuming that counter 20 reads zero at the "start" point of each cycle of movable element motion, then when winding 14 has moved in accordance with one cycle of the movable element motion, the reading on counter 20 at that time will be indicative of the total linear displacement from the "start" point. Since counter 20 is a decimal counter, the indication provided by the counter may be read out directly in millimeters, centimeters, etc. As mentioned previously, counter 20 can be arranged to provide an output signal once a predetermined count has been reached, indicative of a cycle of machine operation being completed, which can be used to return the movable machine element to its "start" position.

For some machine operations, a one millimeter increment of displacement may be too large. That is, increments of 0.1 millimeter may be required instead. One method of adapting the apparatus of FIG. 1a for use in such a case is to change the frequency of the A-C component produced by signal generator 16 from 1 mc. to 10 mc. The wave length of the stress wave propagating in member 10 would, for such a case, be one thousand meters per second divided by 10 mc., or 0.1 millimeter. Thus, pulses from comparator 19 would in that case be accumulated by the counter 20 at a rate of one pulse for every 0.1 millimeter of displacement of winding 14. Another way of adapting the apparatus of FIG. 1a for the aforementioned case, would be to insert a ten times frequency multiplier of conventional construction between the input from signal generator 16 and comparator 19 and a similar ten times frequency multiplier between the input from winding 14 and comparator 19, as shown in FIG. 1c.

It will be obvious to those skilled in the art, that the converse of the above described modification is also true. That is, for those machine operations where one centimeter increment of displacement must be measured, the frequency of the A-C component produced by signal generator 16 may be changed from 1 mc. to 100 kc., or a ten times frequency divider may be substituted for the frequency multipliers 21a and 21b shown in FIG. 1c. Other increments can be selected and made feasible simply by proper selection of frequency of the A-C component of the excitation signal produced by signal generator 16, or the choice of frequency dividers or frequency multipliers as in FIG. 1c, or the choice of resonant frequencies for windings 12 and 14.

Those skilled in the art will recognize that means for establishing a propagating stress wave in member 10 may be other than that shown in FIG. 1a. For example, in FIG. 2 there is shown another illustration of means suitable for use in establishing a stress wave in member 10. In this case, such means includes an electrostrictive device, or transducer, 26, which is mechanically coupled to the end of member 10. The device 26 may be of such materials as quartz, barium titanate, etc., which undergo a longitudinal mechanical stress in response to a supplied electric field, as is well known. In FIG. 2, the excitation means also includes an excitation signal generator 16' similar to that of FIG. 1a for supplying the necessary excitation signal voltage to device 26 so that the device undergoes an oscillatory stress of the desired frequency, such as the 1 mc. frequency assumed for the apparatus of FIG. 1a. Since device 26 is mechanically coupled to the end of member 10, the oscillatory stressing of device 26 will be transferred to member 10, thereby establishing the required propagating stress wave in member 10.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. Apparatus for measuring relative linear displacement between a fixed body and a movable body, comprising:

an elongated member of magnetostrictive material stationed to said fixed body and extending along the direction of motion of said movable body; the ends of said member being terminated to suppress reflections of stress waves from said ends;

excitation means, including an excitation signal generator, for establishing a propagating continuous stress wave in said member, said wave having a wavelength proportional to the smallest increment of displacement to be measured and substantially smaller than the length of said member;

means, including only a single induction winding stationed to said movable body and coupled to said member at a point determined by the relative linear displacement of the two bodies, for deriving an output signal representative of the cyclic variation of said propagating stress wave in said member at the coupling point;

and indicator means, responsive jointly to said excitation signal and to said output signal, for generating a resultant signal each time said movable body undergoes a predetermined increment of linear displacement with respect to said fixed body and for utilizing said resultant signals to provide an indication of the total relative linear displacement undergone by said movable body.

2. Apparatus constructed in accordance with claim 1 wherein said indicator means includes a comparator for comparing a characteristic of said excitation signal with a corresponding characteristic of said output signal for generating a resultant signal each time said two characteristics exhibit a predetermined relationship.

3. Apparatus constructed in accordance with claim 2 wherein said comparator compares the phase characteristics of said excitation signal and said output signal.

4. Apparatus constructed in accordance with claim 2 wherein said comparator compares the amplitude characteristics of said excitation signal and said output signal.

5. Apparatus constructed in accordance with claim 1 wherein said excitation means includes an excitation winding magnetically coupled to said member and responsive to an excitation signal from said excitation signal generator for establishing said propagating continuous stress wave in said member.

6. Apparatus constructed in accordance with claim 1 wherein said excitation means includes an electrostrictive device mechanically coupled to said member and responsive to an excitation signal from said excitation signal generator for establishing said propagating continuous stress wave in said member.

7. Apparatus for measuring relative linear displacement between a fixed body and a movable body, comprising:

an elongated member of magnetostrictive material stationed to said fixed body and extending along the direction of motion of said movable body, the ends of said member being terminated to suppress reflections of stress waves from said ends;

an excitation winding magnetically coupled to said member and effective, in response to a supplied excitation signal, to establish in propagating continuous stress wave in said member, said wave having a wavelength proportional to the smallest increment of displacement to be measured and substantially smaller than the length of said member;

means for generating said excitation signal and for supplying said signal to said excitation winding;

an induction winding, stationed to said movable body and magnetically coupled to said member at a point determined by the relative linear displacement of the two bodies, for deriving an output signal representative of cyclic variations in the amplitude of said propagating stress wave in said member at the coupling point;

a comparator for comparing a characteristic of said excitation signal with a corresponding characteristic of said output signal for generating a resultant signal each time said two characteristics exhibit a predetermined relationship indicating that said movable body has undergone a predetermined increment of linear displacement with respect to said fixed body;

and an accumulator for counting the resultant signals generated by said comparator to provide an indication of the total relative linear displacement undergone by said movable body.

8. Apparatus constructed in accordance with claim 7 wherein said comparator compares the phase characteristics of said excitation signal and said output signal.

9. Apparatus constructed in accordance with claim 8 wherein said comparator compares the amplitude characteristics of said excitation signal and said output signal.

10. Apparatus constructed in accordance with claim 2 wherein said indicator means includes an accumulator for counting the resultant signals generated by said comparator to provide said indication of the total relative linear displacement undergone by said movable body.

References Cited

UNITED STATES PATENTS

| | | | |
|---|---|---|---|
| 3,122,665 | 2/1964 | Bailey | 324—58 X |
| 3,270,281 | 8/1966 | Mandle | 324—68 |
| 2,401,094 | 5/1946 | Nicholson | 324—34 |
| 3,300,715 | 1/1967 | Tresselt | 324—58.5 |

RUDOLPH V. ROLINEC, *Primary Examiner.*

P. A. VRIBE, *Assistant Examiner.*